US United States Patent Office 2,732,342
Patented Jan. 24, 1956

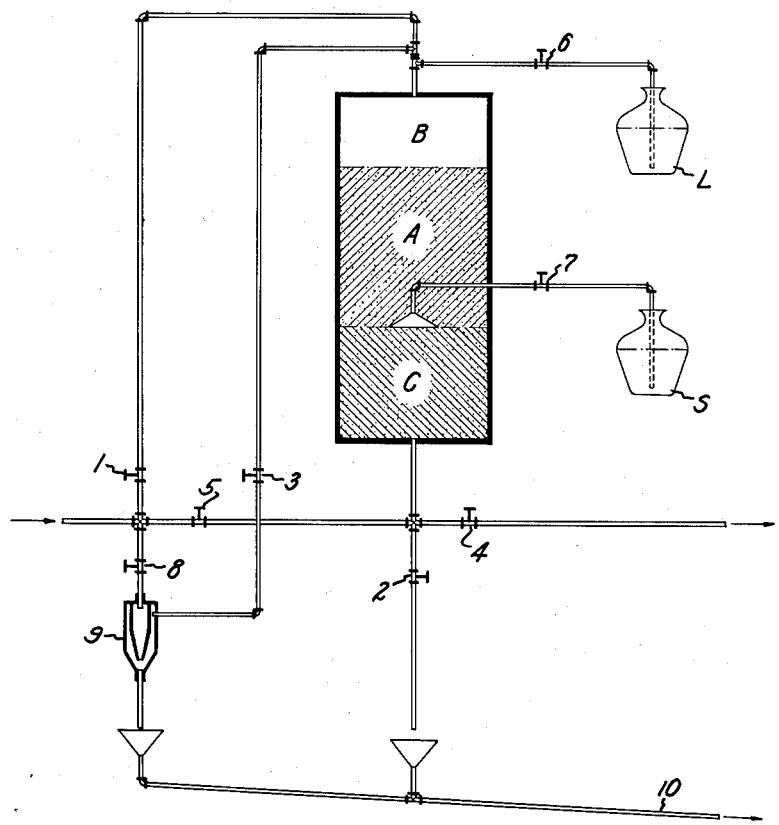

2,732,342
PROCESS AND APPARATUS FOR THE REMOVAL OF SALTS FROM WATER

Otto Frey, Rieden, near Baden, Switzerland, assignor to Aktiengesellschaft Brown, Boveri & Cie, Baden, Switzerland, a joint-stock company Application May 19, 1952, Serial No. 288,721

Claims priority, application Switzerland May 31, 1951

6 Claims. (Cl. 210—24)

Chemical procedures and devices for the removal of salts from water are known in which two different types of synthetic resins are used, of which one exchanges anions and the other exchanges cations. The water from which the salt is to be removed may be passed serially through two different vessels, each of which contains one of the two types of synthetic resins. After some operating time the synthetic resin fillings must be regenerated with the aid of acid and alkali. Alternatively the water may be passed through a single vessel containing a mixture of the two types of synthetic resins. For the regeneration of such a synthetic resin mixture the resins must be separated from each other. This may be done in the vessel itself, on the basis of the different specific weights of the two resin types. The resins must then be re-mixed for use in the next period of water treatment.

Heretofore it has been customary to effect this remixing of the two resins by blowing compressed air into the vessel, the air stream customarily being blown from the bottom towards the top of the vessel through the filling. The air used for the mixing of the resins must be as free as possible from impurities, particularly oil fumes which are very detrimental to the ion exchange properties of the resins. Since the compressed air installations which frequently are present in factories which also require water purification generally supply air containing oil fumes it is generally necessary to provide oil separators to remove such oil fumes. A single failure of an oil separator may result in damage to or destruction of the relatively costly resin.

In accordance with the present invention, in order to eliminate this danger of contamination of the resins the air needed for mixing the resins is caused to flow into the bottom of the vessel containing the resins from the atmosphere by creating a vacuum in the vessel. This method affords the one very important advantage that the clean air needed for mixing the resins can be sucked in directly from the atmosphere and passed through the resin filling without being compressed with the attendant danger of contamination with oil fumes.

In addition, it has been found in the operation of salt removing installations of the described type, that the resin types are mixed more rapidly and thoroughly by a pulsating air passage than by a uniform flow of air. If the free space in the vessel above the resin filling, which can be evacuated by a comparatively small vacuum pump, is used as vacuum chamber, then the air stream can without difficulty be sucked through the resin filling in strong pulsations. The suction procedure therefore also affords the advantage that the erection of a large and expensive air compressor is spared. Furthermore the gases collecting in the resin filling during the regeneration of the same may be removed again by the vacuum. Further, if a water-jet aspirator is used as the vacuum pump, and is operated with the impure water normally available, the waste water of this air aspirator can be used for rinsing of the discharge conduit of the salt removing installation. This is advantageous because the quite considerable quantities of acid in the discharge during the regeneration of the resins must be disposed of rapidly and safely.

The invention thus concerns a procedure for the removal of salt from water by means of a mixture of ion-exchanging resins which are separated for the purpose of regeneration and then re-mixed by means of an air stream passed through the resin filling, and consists in that the air stream is sucked through the resin filling by creating a vacuum in the hollow space within the resin container above the resin filling. It is moreover advantageous to suck the air stream in surges through the resin filling.

The apparatus for carrying out the procedure according to the invention comprises a vacuum pump for producing the vacuum in the hollow space above the resin filling. It is expedient to use a water jet vacuum pump whose waste water can be used for rinsing the discharge conduit for the liquids produced in the regeneration of the resins.

The invention is to be explained in more detail with reference to the accompanying drawing, which diagrammatically represents an illustrative embodiment of a salt removing device in accordance with the invention.

The drawing shows diagrammatically a vessel having three zones marked, A, B and C. Valves 1 to 8 control the flow of liquids through the conduits associated therewith. 9 representes a water-jet vacuum pump and 10 represents the liquid discharge conduit from the system. L is a storage vessel for alkali and S is a vessel for acid.

In the vessel ABC there is a filling of two types of resins in granular form which have the ability to exchange anions and cations with the dissolved salts in the stream of water to be purified. During the salt removing process the two types of resin grains are mixed. For the regeneration of the resins the granules must be temporarily separated which is effected on the basis of their different specific weights in a known manner by slurrying and settling. The drawing shows the resin separated in the zones A and C, the resin which is able to exchange anions occupying the zone A, while the resin which exchanges cations occupies the zone C. Above the resin filling there is a space B in which there is no resin.

When the resin filling must be regenerated the layering of the resins shown in the drawing is brought about in the following manner. At first the water level is lowered to the surface of the mixed resin filling by opening valves 2 and 3, all other valves being closed. Through valve 3 the air flowing backwards through the water-jet vacuum pump 9 enters the zone B and water flows out through the valve 2.

The resins are then slurried with water, which enters the vessel from below, valves 3 and 5 being open while all other valves are closed. The air in the vessel escapes through valve 3 and the pump 9 while water enters by way of the valve 5. The somewhat heavier resin particles, which exchange cations, sink down and fill the zone C while the lighter particles, which exchange anions, float on top and become layered in the zone A. During the slurrying the water level in the vessel naturally rises and must then be lowered again before the regeneration by opening valves 2 and 3 and closing all other valves as described above.

Through the valve 6 one now allows the required quantity of alkali to be sucked in from the vessel L for the regeneration of the resin in zone A, valves 2 and 6 being open and all other valves closed. After this one rinses the resins by opening only valves 1 and 2. In the same manner the resin in the zone C is then regenerated with acid drawn from the vessel S by opening only valves 2 and 7. One then again rinses the resins by opening only valves 1 and 2.

The now regenerated two resin types are now mixed by operation of the vacuum pump. The water-jet vacuum pump 9 is supplied with water by opening valve 8 and aspirates air out of the space B through valve 3. As soon as the vacuum in this space has risen to about 80% air is admitted to the vessel from below by opening the valve 2. The flow of air through the bed of resins serves to mix them. The inflow of air soon reduces the vacuum in the vessel to a point at which the inflow of air becomes ineffective to mix the resins. At this point the valve 2 is closed, whereupon the pump 9 restores the vacuum and valve 2 is opened again. This sequence is repeated until the mixing of the resins has become complete.

The water discharged from the water-jet vacuum pump 9 during the mixing process serves for rinsing the conduit 10 free of salt and acid discharged into it during the regenerating operation.

After the regeneration and mixing of the resins described above, the salt removing operation is started by opening valves 1 and 4 and all other slide valves are closed. Crude water flows through valve 1 into the vessel from the top, and through the layer of the mixed resins and the purified water is led out of the salt removing installation through the valve 4.

I claim:

1. In a process for the separation of salts from water comprising passing the water through a closed chamber containing a bed of a mixture of two resins in granular form, one resin being capable of anion exchange and the other being capable of cation exchange, separating the resins into zones in said chamber by slurrying with water, regenerating the resins by treatment with alkali and acid and re-mixing the resins by levitation with air, the improvement which consists in effecting the mixing of the resins by creating a partial vacuum in said chamber and admitting air at a higher pressure than said partial vacuum but not greater than atmospheric pressure into the bed of resins.

2. Process as defined in claim 1 in which the chamber is evacuated before air is admitted, air is then admitted at a rate greater than the rate of evacuation, the admission of air is stopped and the chamber again evacuated and this sequence of operations is repeated until the resins are suitably mixed.

3. Apparatus for the separation of salt from water comprising a chamber, a bed of ion exchange resins within said chamber only partly filling the same, a vacuum pump connected to said chamber adjacent the upper end thereof, means independent of said vacuum pump for admitting air from the atmosphere into said chamber adjacent the bottom thereof and independent means for controlling the operation of said vacuum pump and said means for admitting air.

4. Apparatus as defined in claim 3 in which the vacuum pump is a water jet aspirator and in which the means for admitting air is capable of admitting air at a rate greater than the capacity of said vacuum pump.

5. Process as defined in claim 1 in which the air is admitted to the chamber in pulsations.

6. Process as defined in claim 1 in which the bed of remixed resins is evacuated by said partial vacuum.

References Cited in the file of this patent

UNITED STATES PATENTS

| | | |
|---|---|---|
| 317,457 | Hodgkin et al. | May 5, 1885 |
| 1,354,604 | Duggan | Oct. 5, 1920 |
| 1,718,244 | Marsh et al. | June 25, 1929 |
| 1,775,412 | Tannehill | Sept. 9, 1930 |
| 2,068,099 | Engle | Jan. 19, 1937 |
| 2,461,506 | Daniel | Feb. 15, 1949 |
| 2,610,945 | Purcell | Sept. 16, 1952 |
| 2,698,292 | Mueller | Dec. 28, 1954 |

OTHER REFERENCES

Ind. and Eng. Chem., vol. 43, No. 3, March 1951, pages 730–734.